(12) United States Patent
McDevitt

(10) Patent No.: US 10,625,647 B1
(45) Date of Patent: Apr. 21, 2020

(54) SEATBACK SUPPORT STRUCTURES WITH VARIABLE AND ADJUSTABLE STIFFNESS

(71) Applicant: The Boeing Company, Chicago, IL (US)

(72) Inventor: Robert Francis McDevitt, Seattle, WA (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 16/152,225

(22) Filed: Oct. 4, 2018

(51) Int. Cl.
  *B60N 2/66* (2006.01)
  *B64D 11/06* (2006.01)
  *A47C 7/44* (2006.01)

(52) U.S. Cl.
  CPC .............. *B60N 2/667* (2015.04); *A47C 7/441* (2013.01); *B64D 11/0647* (2014.12)

(58) Field of Classification Search
  None
  See application file for complete search history.

(56) References Cited

U.S. PATENT DOCUMENTS

| | | | | |
|---|---|---|---|---|
| 3,602,537 A * | 8/1971 | Kerstholt | ........... | A47C 1/03238 297/300.5 |
| 3,973,797 A * | 8/1976 | Obermeier | ............. | A47C 7/462 297/284.4 |
| 4,162,807 A * | 7/1979 | Yoshimura | ............. | A47C 7/462 267/89 |
| 4,465,317 A * | 8/1984 | Schwarz | ................ | B60N 2/666 297/284.4 |
| 4,889,385 A * | 12/1989 | Chadwick | .............. | A47C 3/026 297/300.1 |
| 5,080,318 A * | 1/1992 | Takamatsu | ............. | A47C 3/026 248/598 |
| 5,344,211 A * | 9/1994 | Adat | ........................ | A47C 7/42 297/230.14 |
| 6,619,739 B2 * | 9/2003 | McMillen | .............. | A47C 7/462 297/284.7 |

(Continued)

FOREIGN PATENT DOCUMENTS

DE    3243911 A1 *   5/1984   ............. A47C 1/143

*Primary Examiner* — David E Allred
(74) *Attorney, Agent, or Firm* — Dascenzo Intellectual Property Law, P.C.

(57) ABSTRACT

Seatback support structures may allow a user to selectively adjust the effective stiffness of a seat, between a plurality of settings, to increase individualized comfort for the user. A plurality of stabilizing members may be cantilevered with respect to a base member, with the amount of deflection of the stabilizing members in response to a given load being variable via a stiffness adjustment mechanism of the seatback support structure. Said stiffness adjustment mechanism may include a linkage that is mechanically moved with respect to the stabilizing members to adjust the weight distribution amongst the stabilizing members, thereby adjusting the effective stiffness of the seatback support structure. Such seatback support structures may be configured to operate substantially irrespective to changes in air pressure, and may be incorporated into any number of passenger seats, such as on aircraft, trains, and other vehicles. Methods of forming such seatback support structures are also disclosed.

20 Claims, 7 Drawing Sheets

(56) References Cited

U.S. PATENT DOCUMENTS

| | | | | |
|---|---|---|---|---|
| 6,666,511 B2* | 12/2003 | Schuster | ............... | A43D 3/1433 |
| | | | | 297/284.1 |
| 6,908,152 B2* | 6/2005 | McMillen | ................ | B60N 2/66 |
| | | | | 297/284.4 |
| 2002/0000745 A1* | 1/2002 | Conte | .................... | A47C 3/025 |
| | | | | 297/302.3 |
| 2007/0267912 A1* | 11/2007 | Britton | ................... | A47C 7/024 |
| | | | | 297/452.49 |
| 2009/0079238 A1* | 3/2009 | Plikat | ................ | A47C 1/03255 |
| | | | | 297/217.2 |
| 2009/0102268 A1* | 4/2009 | Schmitz | ............. | A47C 1/03255 |
| | | | | 297/452.19 |
| 2009/0261637 A1* | 10/2009 | Schmitz | ............. | A47C 1/03255 |
| | | | | 297/217.2 |
| 2010/0289308 A1* | 11/2010 | Schmitz | ............. | A47C 1/03255 |
| | | | | 297/300.2 |
| 2016/0227935 A1* | 8/2016 | DeJule | ................... | A47C 7/445 |
| 2019/0274433 A1* | 9/2019 | DeJule | ................... | A47C 7/445 |

* cited by examiner

SEATBACK SUPPORT STRUCTURES WITH VARIABLE AND ADJUSTABLE STIFFNESS

FIELD

The present disclosure relates to seatback support structures having a variable and adjustable stiffness.

BACKGROUND

Seat backs, such as in aircraft or other vehicles, support a user's weight when seated. Typical airline seats have a cushioned, but rigid base and back, with a pivot between them. In a given vehicle with multiple seats, the seat backs are typically all standardized (e.g., the same size, shape, and/or stiffness). This can create discomfort for some users, such as those who are significantly taller or shorter than average, those that are significant heavier or lighter than average, and so on. Differing user postures and preferences on rigidity may also result in discomfort. Previous attempts at addressing discomfort for users have included incorporating air bladders to vary seat stiffness. However, these solutions are not well-suited for use in aircraft with changing altitudes because the air bladders may lose or gain stiffness during climb and descent due to changes in air pressure, and thus may not always be capable of maintaining the user's desired rigidity.

SUMMARY

Presently disclosed seatback support structures are configured to enable a user to selectively adjust the stiffness of their seats, such as via a mechanical means that is not affected by changes in air pressure. For example, disclosed seatback support structures may vary the effective stiffness by changing weight distribution across a plurality of stabilizing members, such as by spreading weight equally among all the stabilizing members, or selectively distributing the user's weight to different members, which may have varying degrees of inherent stiffness. Disclosed seatback support structures thus may provide a variable framework that can respond to loads differently at different locations.

One example of a seatback support structure according to the present disclosure includes a base member, a plurality of stabilizing members extending from the base member, and a stiffness adjustment mechanism comprising at least one linkage. A user may selectively adjust the overall stiffness of the seatback support structure via the stiffness adjustment mechanism. Generally, the stabilizing members are cantilevered such that a first end of each respective stabilizing member is coupled to the base member, and a second end opposite the first end may be a free end (e.g., free to bend, deflect, move, etc., in response to a load applied to the seatback support structure). Adjustment of the stiffness adjustment mechanism selectively adjusts the weight distribution amongst the stabilizing members, thereby adjusting the amount of deflection the stabilizing members undergo in response to a given load, thus changing the effective stiffness experienced by the user. In various configurations, the stiffness adjustment mechanism may distribute different proportions of the user's weight to different respective stabilizing members and/or to different portions of respective stabilizing members, in order to alter the effective stiffness of the seatback support structure.

In some examples, the stiffness adjustment mechanism includes at least one linkage configured to be selectively movable with respect to each of the stabilizing members, such that movement of the linkage changes the effective stiffness of the seatback support structure. For example, the linkage of the stiffness adjustment mechanism may include elongated members that are secured to one or more respective stabilizing members such that movement of the linkage changes the angle of the elongated members with respect to the stabilizing members, thus changing the way the user's weight is distributed to the seatback support structure.

Seats including disclosed seatback support structures, and vehicles (e.g., aircraft) including such seatback support structures are also disclosed. Disclosed methods of making such seatback support structures generally include securing a plurality of stabilizing members to a base member and securing a stiffness adjustment mechanism to the plurality of stabilizing members such that the stiffness adjustment mechanism is configured to change the effective stiffness of the seatback support structure when the at least one linkage is moved with respect to the stabilizing members.

DESCRIPTION

Presently disclosed seatback support structures may be configured to increase comfort for users by providing selectively variable stiffness that isn't affected by the altitude of the aircraft or other vehicle. Such seatback support structures may have a lightweight design and/or a slim profile, and/or may be low cost. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
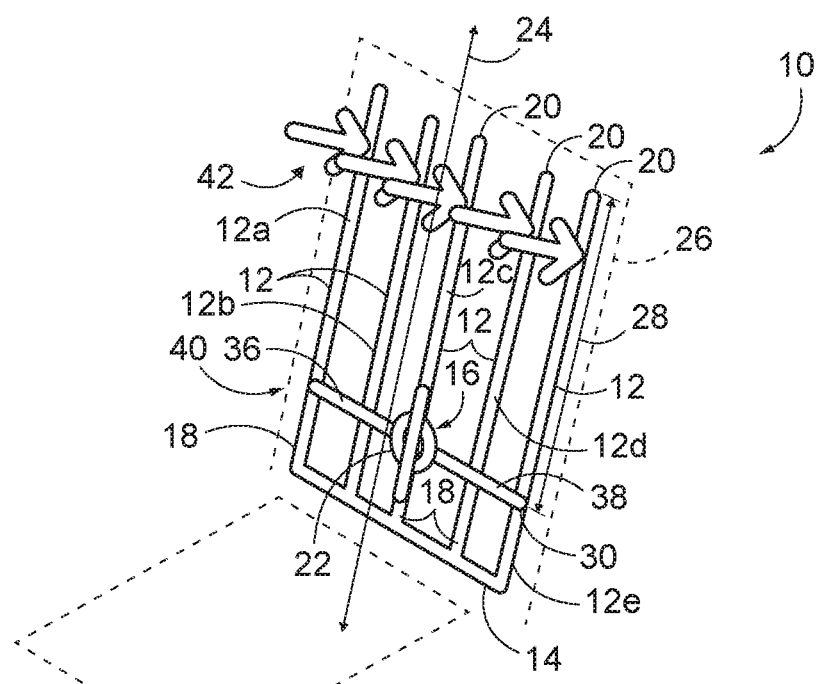
FIG. 1 is a schematic representation of non-exclusive examples of seatback support structures according to the present disclosure, in a first configuration.

FIG. 1 illustrates examples of seatback support structures 10 according to the present disclosure. Such seatback support structures 10 generally include a plurality of stabilizing members 12 extending from a base member 14, and a stiffness adjustment mechanism 16. Each respective stabilizing member 12 is cantilevered, such that a respective first end 18 of the respective stabilizing member 12 is coupled to base member 14. Each respective stabilizing member 12 extends from its respective first end 18 to a respective second end 20, opposite first end 18. Second end 20 is cantilevered with respect to base member 14, such that second end 20 is configured to move with respect to base member 14 when stabilizing member 12 is loaded (e.g., when a passenger rests against a seat including seatback support structure 10). For example, each respective second end 20 may be a free end that is configured to deflect with respect to base member 14 when the stabilizing members 12 are loaded beyond a minimum threshold load.

Stiffness adjustment mechanism 16 generally includes at least one linkage 22 that is configured to be selectively moveable with respect to each of the plurality of stabilizing members 12. Stiffness adjustment mechanism 16 is configured to selectively cause a change in stiffness of seatback support structure 10 when linkage 22 is moved with respect to the plurality of stabilizing members 12. Linkage 22 is generally coupled to at least one respective stabilizing member 12 of the plurality of stabilizing members 12. In various examples, linkage 22 may be coupled to one, two, three, four, five, and/or six or more respective stabilizing members 12. In some examples, linkage 22 may be coupled to each respective stabilizing member 12 (e.g., all of the stabilizing members 12). Additionally or alternatively, linkage 22 may be coupled to a central stabilizing member 12c, which may be centrally located with respect to the other stabilizing members 12 (e.g., an equal number of respective stabilizing members 12 may be positioned on either side of central stabilizing member 12c). In such examples, linkage 22 may be coupled solely to the central stabilizing member 12c, and/or may be coupled to one or more respective other stabilizing members 12 on either side of central stabilizing member 12c. For example, linkage 22 may be coupled to central stabilizing member 12c and a respective adjacent stabilizing member on each side of central stabilizing member 12c (e.g., to stabilizing member 12b and stabilizing member 12d). Additionally or alternatively, linkage 22 may be coupled to the stiffest respective stabilizing member 12 of the plurality of stabilizing members 12. Said stiffest respective stabilizing member 12 may be the central stabilizing member 12c, in some examples. In other examples, the stiffest respective stabilizing member 12 may be any of the other respective stabilizing members 12 on either side of central stabilizing member 12c.

In operation, movement of linkage 22 with respect to base member 14 changes an amount of deflection of at least one stabilizing member 12. Put another way, movement of linkage 22 with respect to base member 14 changes an effective cantilever length of at least one stabilizing member 12, where the effective cantilever length is defined as a distance 28 between a point 30 on the respective stabilizing member 12 that is engaged with linkage 22 and second end 20 of the respective stabilizing member 12. For example, linkage 22 is shown in a first position in FIG. 1, and in a second position in FIG. 2. In FIG. 1, a portion of linkage 22 is coupled to stabilizing member 12e at point 30, and the effective cantilever length is defined by distance 28, between point 30 and second end 20. By comparison, in FIG. 2, a portion of linkage 22 has been moved towards base member 14 (along arrow 32), while another portion of linkage 22 is moved away from base member 14 (along arrow 34), as a result. Thus, point 30 is closer to second end 20 in FIG. 2, and the effective cantilever length is reduced, as indicated by distance 28', which is shorter than distance 28 shown in FIG. 1. Such changes in the effective cantilever length of stabilizing members 12 change the overall effective stiffness of seatback support structure 10. For example, the position shown in FIG. 1 may allow for a greater deflection of stabilizing members 12 under a given applied load, and thus less overall stiffness, whereas the position shown in FIG. 2 may allow for less deflection of stabilizing members 12 under the same applied load, and thus provide a greater overall stiffness for a user leaning against seatback support structure 10 in this configuration. Because stiffness adjustment mechanism 16 is mechanical in nature, it is configured to operate substantially irrespective to changes in air pressure surrounding seatback support structure 10.

Linkage 22 may be selectively moved in different directions to selectively adjust the stiffness of seatback support structure 10. For example, linkage 22 may be configured to reduce a deflection of at least one of stabilizing member 12 under a given load, by shortening its effective cantilever length when moved in a first direction with respect to base member 14. Similarly, linkage 22 may be configured to increase the deflection of at least one stabilizing member 12 under the given load, by increasing its effective cantilever length of when moved in a second direction (e.g., opposite the first direction) with respect to base member 14. The amount of deflection of respective second ends 20 of respective stabilizing members 12, in response to a given load, may be less than 1 inch, less than 2 inches, less than 3 inches, less than 4 inches, less than 5 inches, less than 6 inches, less than 7 inches, and/or less than 8 inches, with the amount of deflection being measured from the position of the respective second end 20 in a resting configuration (e.g., with no applied load on seatback support structure 10).

In some examples, stiffness adjustment mechanism 16 may be configured to selectively adjust the distribution of a load (e.g., the user's weight) among the stabilizing members such that the weight distribution is different when stiffness adjustment mechanism 16 is in different configurations. For example, in the configuration, or position, shown in FIG. 1, a greater portion of an applied load may be distributed to central stabilizing member 12c than in the second configuration, or position, shown in FIG. 2, in which more of the applied load may be distributed to other respective stabilizing members 12. Additionally or alternatively, stiffness adjustment mechanism 16 may be configured to distribute a greater portion of the user's weight to the stiffest respective stabilizing member (which may be central stabilizing member 12c, or a different stabilizing member 12) in the first configuration than in a different configuration. In some configurations, the user's weight may be spread substantially equally across each respective stabilizing member 12. In some examples, different configurations of stiffness adjustment mechanism 16 may result in different proportions of a user's weight being supported by different portions of seatback support structure 10. For example, a greater portion of the user's weight may be distributed to stiffer portions of seatback support structure 10 when stiffness adjustment mechanism 16 is positioned in a stiffer configuration than when stiffness adjustment mechanism 16 is positioned in a more compliant, or flexible, configuration. Stiffness adjustment mechanism 16 may be configured to distribute the user's weight to different respective stabilizing members 12, depending on the adjustment of the effective stiffness of seatback support structure 10. For example, in seatback support structures 10 having stabilizing members 12 of varying stiffnesses, more of the user's weight may be distributed to the stiffer stabilizing members 12 in one configuration, while more of the user's weight would be distributed to the more flexible stabilizing members 12 in another configuration.

Stiffness adjustment mechanism 16 may be selectively adjustable between any number of configurations (e.g., two, three, four, five, and/or six or more configurations), each providing a different overall stiffness for seatback support structure 10, and/or each providing different portions of different stiffnesses within seatback support structure 10. For example, stiffness adjustment mechanism 16 may be configured to adjust the stiffness of one or more portions of seatback support structure 10 independently of one another in some examples. For example, stiffness adjustment mechanism 16 may be configured to selectively adjust the stiffness of a lower back region 40 of seatback support structure 10, independently of an upper back region 42. In some examples, stiffness adjustment mechanism 16 may be configured to selectively adjust the stiffness of seatback support structure 10 between a plurality of different discrete settings (e.g., least overall stiffness, middling stiffness, and greatest stiffness settings). In some examples, stiffness adjustment mechanism 16 may be configured to selectively adjust the stiffness of seatback support structure 10 along a continuum between a minimum and maximum stiffness.

Figure 2:
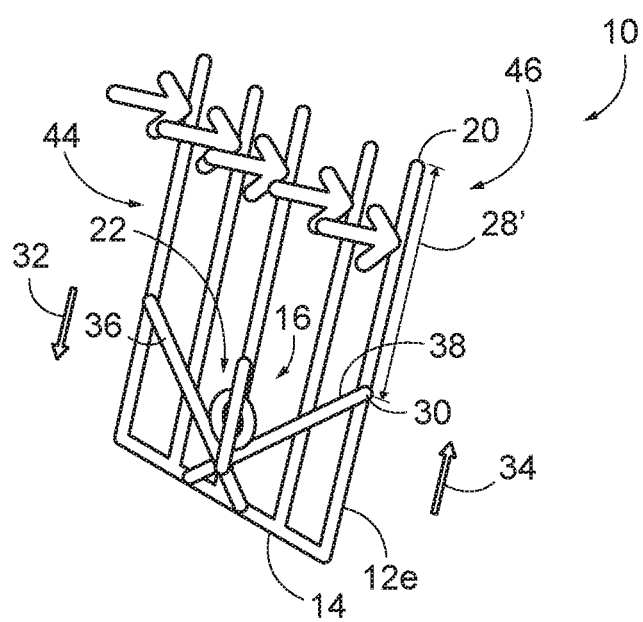
FIG. 2 is a schematic representation of non-exclusive examples of seatback support structures according to the present disclosure, in a second configuration.

As shown in FIGS. 1-2, linkage 22 may include a first elongated member 36 and a second elongated member 38, each of which may be coupled to one or more respective stabilizing members 12. For example, first elongated member 36 may be coupled to stabilizing member 12a, stabilizing member 12b, and/or stabilizing member 12c, and second elongated member 38 may be coupled to stabilizing member 12c, stabilizing member 12d, and/or stabilizing member 12e. First elongated member 36 and second elongated member 38 may be arranged differently in different configurations of linkage 22. For example, in the first configuration shown in FIG. 1, first elongated member 36 and second elongated member 38 may be substantially parallel to base member 14. In a different configuration (e.g., the second configuration shown in FIG. 2), first elongated member 36 and second elongated member 38 may be non-parallel and/or non-perpendicular to base member 14. Additionally or alternatively, first elongated member 36 and second elongated member 38 may be substantially perpendicular to one or more stabilizing members 12 in the first configuration, and arranged at a non-perpendicular angle to one or more stabilizing members 12 in a different configuration (e.g., the second configuration shown in FIG. 2). Additionally or alternatively, first elongated member 36 and second elongated member 38 may be substantially parallel and/or co-linear to one another in the first configuration, and non-parallel to one another in a different configuration (e.g., the configuration shown in FIG. 2, in which first elongated member 36 is substantially perpendicular to second elongated member 38). While linkage 22 is illustrated having first elongated member 36 and second elongated member 38, in some examples of seatback support structure 10, linkage 22 may include just a single elongated member arranged for crosswise support of stabilizing members 12. Elongated members (whether linkage 22 includes a single elongated member or two or more elongated members) may be linear, curved, and/or angled, in various examples of seatback support structure 10.

As shown, in some examples, base member 14 is arranged substantially perpendicularly to stabilizing members 12. In these examples, stabilizing members 12 may be arranged substantially along a longitudinal axis 24 of seatback support structure 10. In other examples, one or more stabilizing members 12 may extend at a non-perpendicular angle from base member 14. At least a portion of seatback support structure 10 (e.g., base member 14, stabilizing members 12, and/or stiffness adjustment mechanism 16) is generally embedded and/or positioned within a seatback 26, which may be, for example, the seatback of an airline seat. Seatback 26 may be hollow, partially hollow, at least partially filled with cushioning materials, at least partially filled with foam materials, and/or solid in construction.

Seatback support structure 10 may be said to have a front portion 44 configured to face and support a user's back while the user is seated, and a rear portion 46 opposite the front portion. In some examples, some or all of stiffness adjustment mechanism 16 (e.g., linkage 22) is coupled to rear portion 46. In some examples, some or all of stiffness adjustment mechanism 16 may be positioned externally to seatback 26. For example, linkage 22 may be within seatback 26, while a user interface may be positioned externally to seatback 26, for access by the user. Such user interface may be configured to enable the user to selectively adjust the effective stiffness of seatback support structure 10, via stiffness adjustment mechanism 16. Any suitable user interface may be included to selectively move linkage 22 with respect to stabilizing members 12. In some examples, the user interface may be configured to mechanically, physically, electronically, and/or hydraulically move linkage 22 in response to a manual and/or electronic adjustment by the user. Additionally or alternatively, the user interface may enable a user to adjust a portion of seatback support structure 10 individually, such as lower back region 40 and upper back region 42. Additionally or alternatively to a user interface, seatback support structure 10 may be configured to be adjusted automatically, via a controller. For example, a controller may receive feedback from one or more sensors, may utilize artificial intelligence, and/or may execute one or more algorithms to automatically adjust the stiffness of seatback support structure 10 in various settings. In some examples, said controller may be configured to adjust the stiffness of seatback support structure 10 in response to a high-level command, such as "maximum stiffness," or "lumbar support."

Each respective stabilizing member 12 of the plurality of stabilizing members may be substantially identical, in some examples. In other examples, one or more respective stabilizing members 12 may be different from one or more other respective stabilizing members 12, such as in terms of thickness, material, stiffness, modulus, curvature, length, and/or cross-sectional shape. In one specific example, central stabilizing member 12c may be the stiffest respective stabilizing member 12, with the respective stiffnesses of other stabilizing members 12 decreasing as distance from central stabilizing member 12c increases (e.g., stabilizing members 12b and 12d may be less stiff than central stabilizing member 12c, but stiffer than stabilizing members 12a and 12e). In other words, stabilizing member 12a (which may be referred to as the left stabilizing member) may be less stiff than central stabilizing member 12c, stabilizing member 12e (which may be referred to as the right stabilizing member) may be less stiff than central stabilizing member 12c, stabilizing member 12b (positioned between stabilizing members 12a and 12c) may be less stiff than central stabilizing member 12c and more stiff than left stabilizing member 12a, and/or stabilizing member 12d (positioned between stabilizing members 12c and 12e) may be less stiff than central stabilizing member 12c and more stiff than right stabilizing member 12e.

Additionally or alternatively, one or more stabilizing members 12 may have a variable thickness, cross-sectional area or shape, density, and/or material composition along its length. For example, a respective stabilizing member 12 may be thicker in one area than in another, such as being thicker near base member 14 than it is near its second end 20. As another example, a respective stabilizing member 12 may have a greater stiffness adjacent its second end 20 than it does near its first end 18, a greater stiffness adjacent its first end 18 than adjacent its second end 20, and/or other portions that are stiffer than other respective portions along the length of the stabilizing member 12. Characteristics of each stabilizing member 12, such as its curvature and cross-sectional shape, may be varied to achieve optimum overall and local rigidity, as well as for comfort and ergonomic properties. Variations along the length of stabilizing members 12 may be tapered (e.g., change along a gradient), or may exhibit stepped changes along the length.

Stabilizing members 12 may be formed of any suitable materials or combinations of materials, such as any combination of metal, plastic, or composite materials. In some examples, stabilizing members 12 may include reinforcements and/or additives, selected to optimize the functionality of the stiffness adjustment system and meet other application requirements. Some specific examples of suitable materials for stabilizing members 12 include, but are not limited to, nylon, PEEK, glass fibers, carbon fibers, and/or combinations or composites thereof. One or more stabilizing members 12 (and/or portions of one or more stabilizing members 12) may be solid, hollow, partially hollow, and/or porous, in various examples of seatback support structure 10. Additionally or alternatively, one or more stabilizing members 12 may include one or more inserts of a material different in composition and/or material properties from the material of the remainder of the stabilizing member 12. Such inserts and/or reinforcements may be positioned along the length of stabilizing member 12, or just in certain areas along the length of stabilizing member 12, such as near first end 18, near second end 20, in a middle region of stabilizing member 12 between first end 18 and second end 20, and/or may be positioned to correspond to desired regions of a user's back, such as by being positioned to provide lumbar support.

Seatback support structure 10 may be provided as a standalone seat back, though is generally incorporated into a seatback 26 of a seat in a passenger vehicle, such as in an aircraft (e.g., passenger and/or pilot seats). For example, seatback support structure 10 may be embedded within an otherwise conventional seatback 26, and be surrounded or covered by internal padding and/or cushioning materials, foam, shock-absorbing materials, etc. For example, materials such as polypropylene based particle foam (e.g., Neopolen®), polyetherol and isocyanate based foams (e.g., Elastoflex®), and/or glass fiber reinforced polyamide (e.g., Ultramid® or Ultracom®) may be placed surrounding, between, above, below, and/or around stabilizing members 12 of seatback support structure 10, to increase comfort for the user. Seats including disclosed seatback support structures 10 may include local reinforcements to enhance overall ergonomics of the seat. In some examples, a passenger aircraft may be provided, wherein a plurality of passenger seats within the aircraft may include a disclosed seatback support structure 10, such that each such passenger may adjust the stiffness of his or her seat independently of other passengers. For example, an aircraft may include a respective seatback support structure 10 incorporated into every passenger seat, in some examples. In some examples, an aircraft may incorporate such seatback support structures 10 into certain sections of the aircraft, such as in first class and/or business class seats. Additionally or alternatively, an aircraft may incorporate presently disclosed seatback support structures 10 into pilot seats, or other crew seats. Similarly, such seatback support structures 10 may be incorporated into seats for passenger trains, passenger buses, and/or any other vehicles with seated users.

Seatback support structure 10 is illustrated with five stabilizing members 12, but may include more or fewer stabilizing members 12 in various examples. Other seatback support structures 10 within the scope of the present disclosure may include two, three, four, five, six, seven, eight, nine, ten, fifteen, and/or twenty or more stabilizing members 12. Stabilizing members 12 are generally spaced apart from each other and do not contact each other during normal use of seatback support structure 10, though there may be certain examples where one or more adjacent stabilizing members 12 may contact one another during use.

Stiffness adjustment mechanism 16 may include a locking mechanism configured to selectively lock stiffness adjustment mechanism 16 in place, such that once a user adjusts the stiffness of seatback support structure 10, that selected stiffness is maintained by the locking mechanism (e.g., by maintaining the position of stiffness adjustment mechanism 16) until the user selectively adjusts the stiffness again.

Some examples of seatback support structure 10 include a stop, or deflection limiting mechanism, configured to limit the overall deflection of seatback support structure 10. For example, the deflection limiting mechanism may be configured to limit encroachment of a passenger into a row behind the seatback support structure. In some examples, by combining features such as adjustable stiffness, different stabilizing members, different padding materials, and/or deflection limiting mechanisms, disclosed seatback support structures 10 may provide increased comfort to a wide range of users, accommodating users of a range of heights and weights. For example, disclosed seatback support structures 10 may be designed to accommodate a range of percentiles of the heaviest and tallest users and/or the lightest and shortest users. As a specific example, disclosed seatback support structures 10 may be configured to accommodate users between the $5^{th}$ and $95^{th}$ percentiles of height and/or users between the $5^{th}$ and $95^{th}$ percentiles of weight. Of course, disclosed seatback support structures 10 may also be configured to provide increased comfort for users outside these ranges (e.g., users shorter than $5^{th}$ percentile, taller than $95^{th}$ percentile, lighter than $5^{th}$ percentile, and/or heavier than $95^{th}$ percentile).

Figure 3:
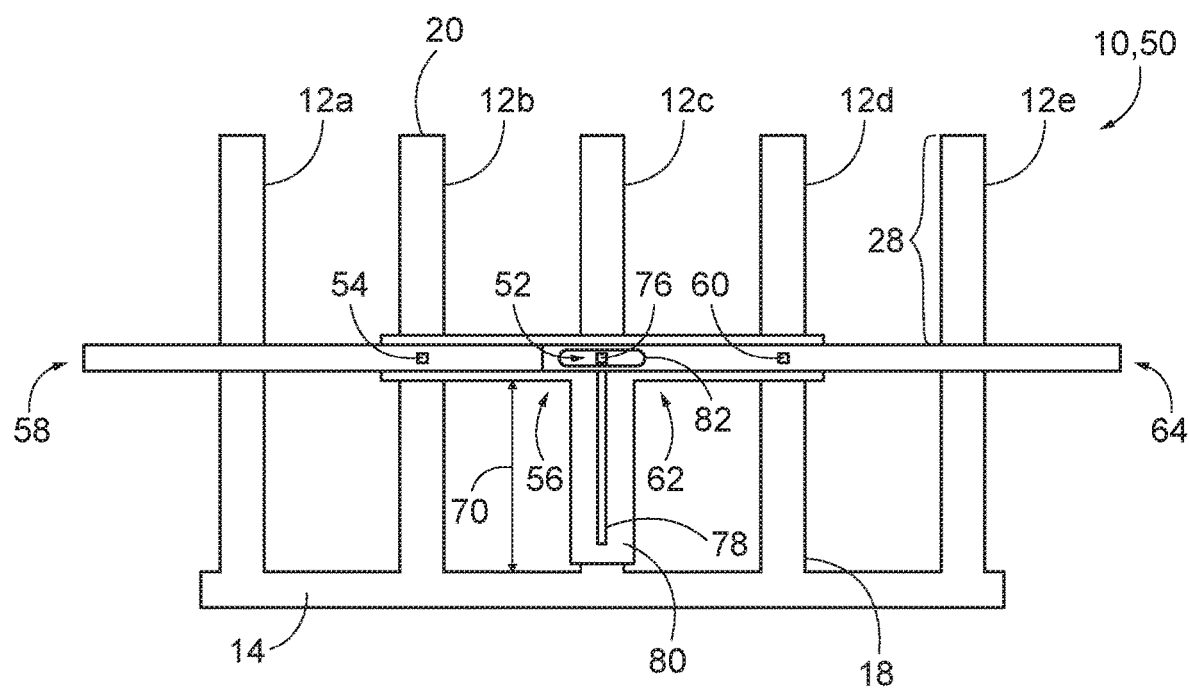
FIG. 3 is another schematic representation of non-exclusive examples of seatback support structures according to the present disclosure, shown in a first position.
Figure 4:
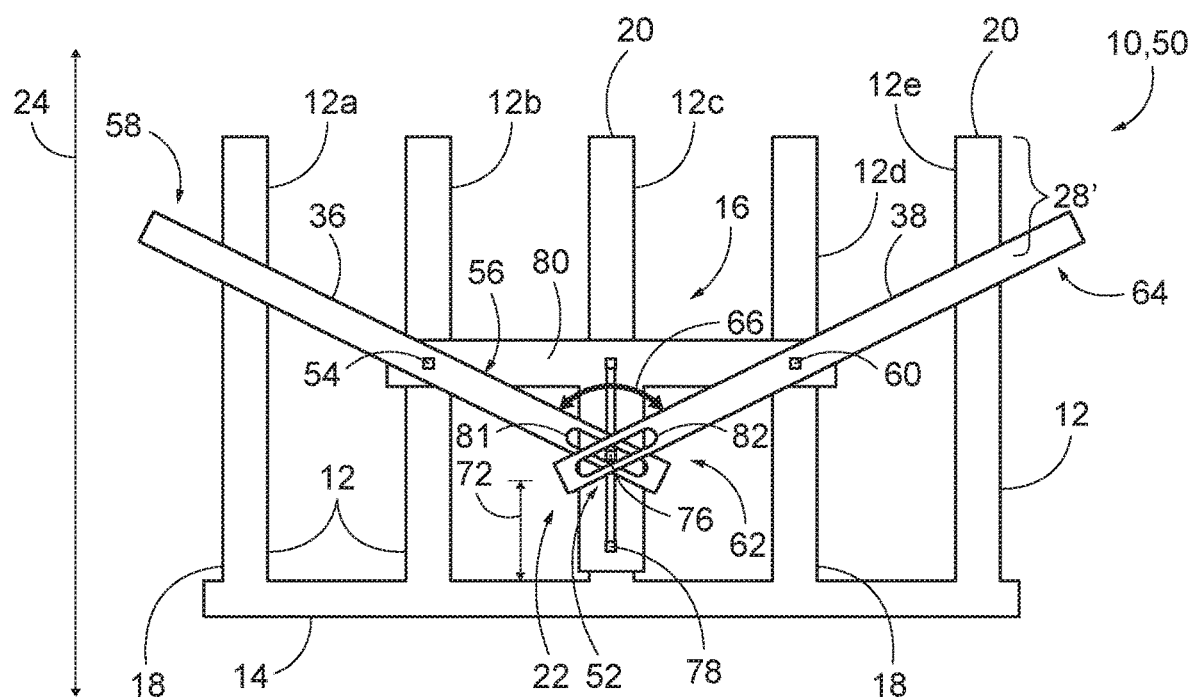
FIG. 4 is a schematic representation of the seatback support structure of FIG. 3, shown in a second position.
Figure 5:
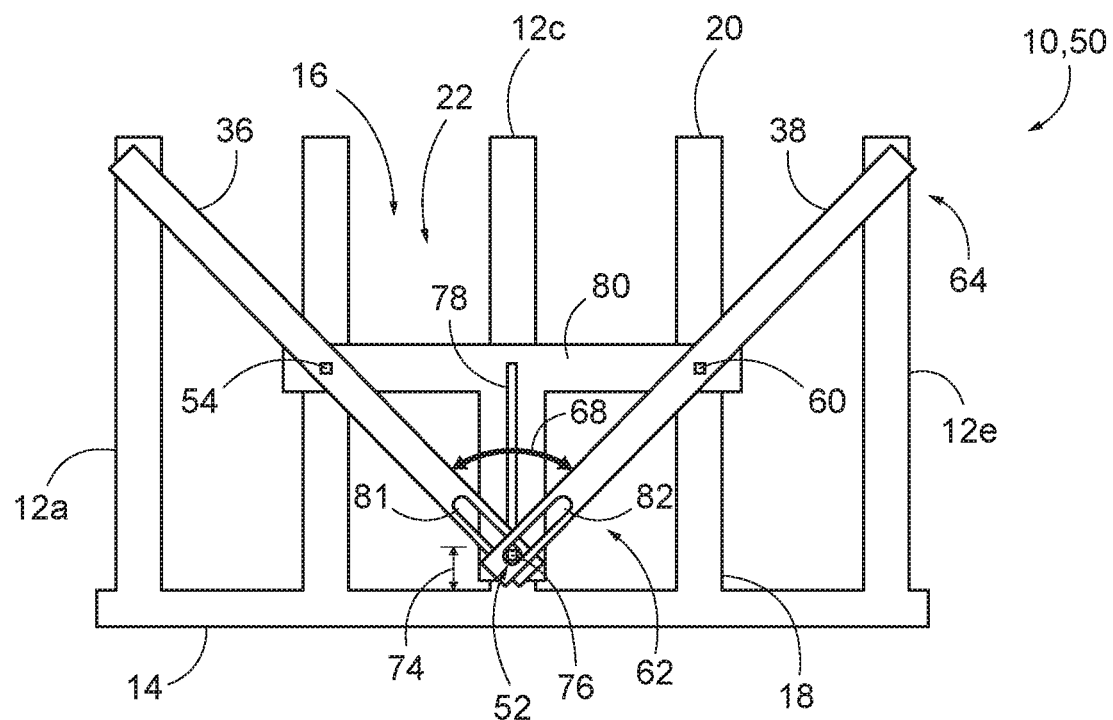
FIG. 5 is a schematic representation of the seatback support structure of FIG. 3, shown in a third position.

Turning now to FIGS. 3-5, an illustrative non-exclusive example of seatback support structure 10 is schematically illustrated. Where appropriate, the reference numerals from the schematic illustrations of FIGS. 1-2 are used to designate corresponding parts of the example of FIGS. 3-5; however, the example of FIGS. 3-5 is non-exclusive and does not limit seatback support structures 10 to the illustrated embodiments of FIGS. 3-5. That is, seatback support structures 10 are not limited to the specific embodiments illustrated, and may incorporate any number of the various aspects, configurations, characteristics, properties, etc. of seatback support structures 10 that are illustrated in and discussed with reference to the schematic representations of FIGS. 1-2 and/or the embodiments of FIGS. 3-5, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 3-5; however, it is within the scope of the present disclosure that the previously discussed features, variants, etc. may be utilized with the example of FIGS. 3-5.

With reference to FIGS. 3-5, a seatback support structure 50, which is an example of seatback support structure 10, is illustrated in three different positions, or configurations. FIG. 3 illustrates seatback support structure 50 in a first configuration corresponding to its most compliant, or most flexible, configuration. FIG. 4 illustrates seatback support structure 50 in a second configuration, providing a medium amount of stiffness. And FIG. 5 illustrates seatback support structure 50 in a third configuration corresponding to the stiffest configuration. A plurality of stabilizing members 12 (in this case, five) are cantilevered from base member 14, each stabilizing member 12 extending from a respective first end 18 (which is coupled to base member 14) to a respective second end 20. Stiffness adjustment mechanism 16 is configured to selectively adjust the stiffness of seatback support structure between the configurations shown in FIGS. 3-5, by moving linkage 22 with respect to base member 14.

In this example, linkage 22 includes first elongated member 36, second elongated member 38, and a sliding member 52. First and second elongated members 36, 38 are operatively coupled to sliding member 52 such that as sliding member 52 is moved longitudinally (e.g., along longitudinal axis 24) toward or away from base member 14, the orientations of first and second elongated members 36, 38 are changed. In this example, sliding member 52 is at a first position with respect to base member 14 in FIG. 3, sliding member 52 is at a second position that is closer to base member 14 in FIG. 4, and sliding member 52 is at a third position closest to base member 14 in FIG. 5. Thus, as sliding member 52 is moved away from base member 14 (towards the configuration shown in FIG. 3), the overall stiffness of seatback support structure 50 is decreased, while as sliding member 52 is moved towards base member 14 (towards the configuration shown in FIG. 5), the overall stiffness of seatback support structure 50 is increased. In other examples, this may be reversed, such that moving sliding member 52 towards base member 14 decreases the stiffness of seatback support structure 50, and vice versa.

Such changes in stiffness of seatback support structure 50 may be accomplished by changing the effective cantilever length of one or more stabilizing members 12. For example, stabilizing member 12e has a first distance 28 in FIG. 3, and a second, decreased, distance 28' in FIG. 4. The effective cantilevered length of stabilizing member 12e is even further reduced in the configuration shown in FIG. 5. Thus, in this example, movement of sliding member 52 away from base member 14 (e.g., from the configuration shown in FIG. 4 to the configuration shown in FIG. 3) increases the effective cantilevered length of stabilizing member 12e (and stabilizing member 12a). Similarly, movement of sliding member towards base member 14 (e.g., from the configuration shown in FIG. 4 to the configuration shown in FIG. 5) decreases the effective cantilevered length of stabilizing members 12a and 12e. In other examples, the respective cantilevered lengths or more or fewer and/or different respective stabilizing members 12 may be affected by moving sliding member 52 with respect to base member 14.

First elongated member 36 and second elongated member 38 are coupled to sliding member 52 of linkage 22. Additionally, first elongated member 36 is coupled to one or more stabilizing members 12, and second elongated member 38 is coupled to one or more stabilizing members 12. In the present example, first elongated member 36 is rotatably coupled to stabilizing member 12b, such that first elongated member 36 may pivot, spin, or rotate with respect to stabilizing member 12b, thereby allowing changes in the angle of first elongated member 36 with respect to base member 14, as stiffness adjustment mechanism 16 is moved among different configurations. For example, in the configuration shown in FIG. 3, first elongated member 36 is parallel to base member 14. In the configuration shown in FIG. 4, sliding member 52 (which is coupled to first elongated member 36) is closer to base member 14 than in the configuration of FIG. 3, and as sliding member 52 is moved towards base member 14, first elongated member 36 rotates with respect to base member 14, such as about a first rotator pin 54 rotatably coupling first elongated member 36 to stabilizing member 12b. Thus, first elongated member 36 is arranged at a non-parallel angle with respect to base member 14 in the configuration shown in FIG. 4, such that a first portion 56 of first elongated member 36 adjacent sliding member 52 is positioned closer to base member 14 than is a second portion 58 of first elongated member 36. First elongated member 36 rotates further about first rotator pin 54 to reach the configuration shown in FIG. 5, with first portion 56 even closer to base member 14 and second portion 58 even further from base member 14 than in the configuration of FIG. 4. Similarly, second elongated member 38 is rotatably coupled to stabilizing member 12d such that second elongated member 38 may pivot, spin, or rotate with respect to stabilizing member 12d, thereby allowing changes in the angle of second elongated member 38 with respect to base member 14, as stiffness adjustment mechanism 16 is moved among different configurations. For example, in the configuration shown in FIG. 3, second elongated member 38 is parallel to base member 14. In the configuration shown in FIG. 4, sliding member 52 (which is coupled to second elongated member 38) is closer to base member 14 than in the configuration of FIG. 3, and as sliding member 52 is moved towards base member 14, second elongated member 38 rotates with respect to base member 14, such as about a second rotator pin 60 rotatably coupling second elongated member 38 to stabilizing member 12d. Thus, second elongated member 38 is arranged at a non-parallel angle with respect to base member 14 in the configuration shown in FIG. 4, such that a first portion 62 of second elongated member 38 adjacent sliding member 52 is positioned closer to base member 14 than is a second portion 64 of second elongated member 38. Second elongated member 38 rotates further about second rotator pin 60 to reach the configuration shown in FIG. 5, with first portion 62 even closer to base member 14 and second portion 64 even further from base member 14 than in the configuration of FIG. 4.

As shown in the configuration, or position, of FIG. 3, first elongated member 36 and second elongated member 38 are perpendicular to stabilizing members 12, which, in this example corresponds to the most flexible configuration of seatback support structure 50. Movement of sliding member 52 causes first elongated member 36 and second elongated member 38 to pivot with respect to stabilizing members 12, as shown in FIGS. 4 and 5. Additionally or alternatively, first elongated member 36 and second elongated member 38 may be substantially co-linear with one another in one configuration of seatback support structure 50, as shown in FIG. 3. In some examples, movement of sliding member 52 causes first elongated member 36 and second elongated member 38 to rotate with respect to one another, such that in a second configuration (e.g., as shown in FIG. 4), they intersect at a first angle 66, and in a third configuration (e.g., as shown in FIG. 5), they intersect at a second angle 68, which is different than first angle 66. Second angle 68 is smaller than first angle 66 in this example, though in other examples, first angle 66 may be greater than second angle 68.

Movement of sliding member 52 with respect to base member 14 changes the distance between sliding member 52 and base member 14. For example, in the first configuration shown in FIG. 3, sliding member 52 is positioned a first distance 70 from base member 14. In the second configuration shown in FIG. 4, sliding member 52 is positioned a second distance 72 from base member 14, second distance 72 being less than first distance 70. In the third configuration shown in FIG. 5, sliding member 52 is positioned a third distance 74 from base member 14, third distance 74 being less than second distance. In some examples, third distance 74 may be small, such that sliding member 52 is contacting or adjacent base member 14. Accordingly, in this example, as sliding member 52 is moved closer to base member 14, the stiffness of seatback support structure 50 is increased, though in other examples, sliding member 52 may be moved away from base member 14 to increase the stiffness of seatback support structure 50. Furthermore, seatback support structure 50 may include additional configurations with sliding member 52 being positioned different distances from base member 14.

In some examples, sliding member 52 slides longitudinally with respect to stabilizing members 12 (i.e., sliding member 52 moves along longitudinal axis 24 of stabilizing members 12). In some examples, sliding member 52 includes a slider pin 76 that slides, or moves longitudinally within a longitudinally extending slot 78 of a slider track 80 of stiffness adjustment mechanism 16. Slider pin 76 is operatively coupled to first elongated member 36 and second elongated member 38 in this example, such that translation (e.g., longitudinal movement) of slider pin 76 in turn causes translation of first portion 56 of first elongated member 36 and first portion 62 of second elongated member 38. Slider track 80 is generally adjacent to one or more stabilizing members 12 of seatback support structure 50, and may be coupled to one or more stabilizing members 12, with longitudinally extending slot 78 generally being parallel to stabilizing members 12. In the example of FIGS. 3-5, slider track 80 is fixedly coupled to at least two stabilizing members, such as to stabilizing members 12b, 12c, and 12d, and is generally T-shaped, though other arrangements are shapes are also within the scope of the present disclosure. First rotator pin 54 may rotatably couple first elongated member 36 to slider track 80 and/or to one or more stabilizing members 12 (e.g., stabilizing member 12b), and second rotator pin 60 may rotatably couple second elongated member 38 to slider track 80 and/or to one or more stabilizing members 12 (e.g., stabilizing member 12d).

Slider pin 76 may thus rotatably couple first elongated member 36 to second elongated member 38, and couple elongated members 36, 38 to slider track 80. First and second elongated members 36, 38 may thus rotate about slider pin 76 as slider pin 76 is translated longitudinally. In some examples first and second elongated members 36, 38 are translated and rotated as slider pin 76 is longitudinally translated with respect to base member 14 and stabilizing members 12. To this end, first elongated member 36 and second elongated member 38 may be slotted to accommodate such movement of slider pin 76 and the elongated members 36, 38. For example, first elongated member 36 may include a first slot 81 positioned within first portion 56, and second elongated member 38 may include a second slot 82 positioned within first portion 62, with slider pin 76 extending through first slot 81 and second slot 82. As slider pin 76 is translated within longitudinally extending slot 78, slider pin 76 may simultaneously be translated within first slot 81 and second slot 82.

Figure 6:
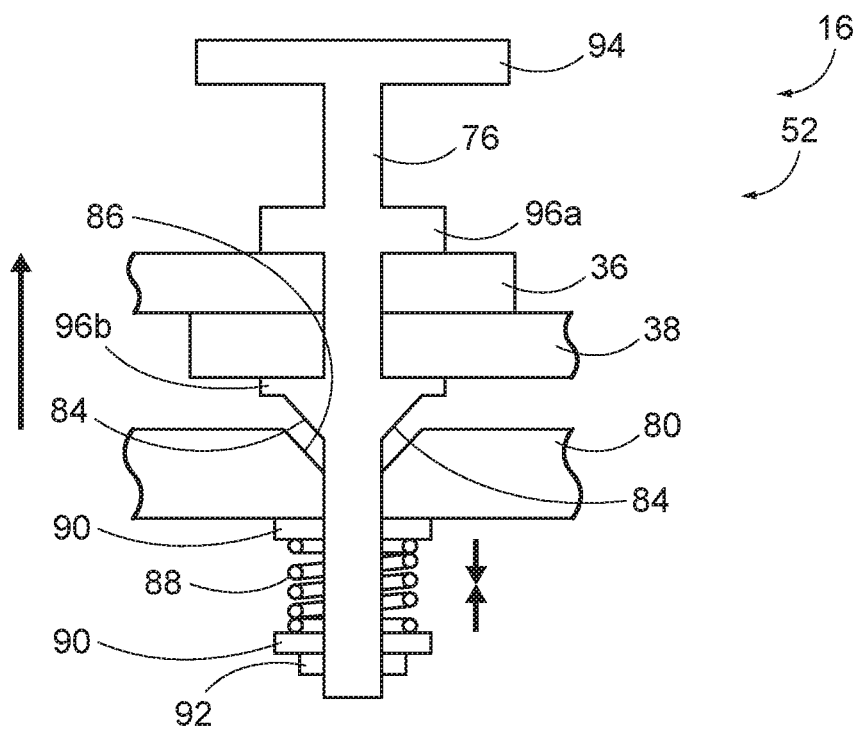
FIG. 6 is a schematic, cross-sectional representation of one example of a stiffness adjustment mechanism for disclosed seatback support structures, in a first configuration.
Figure 7:
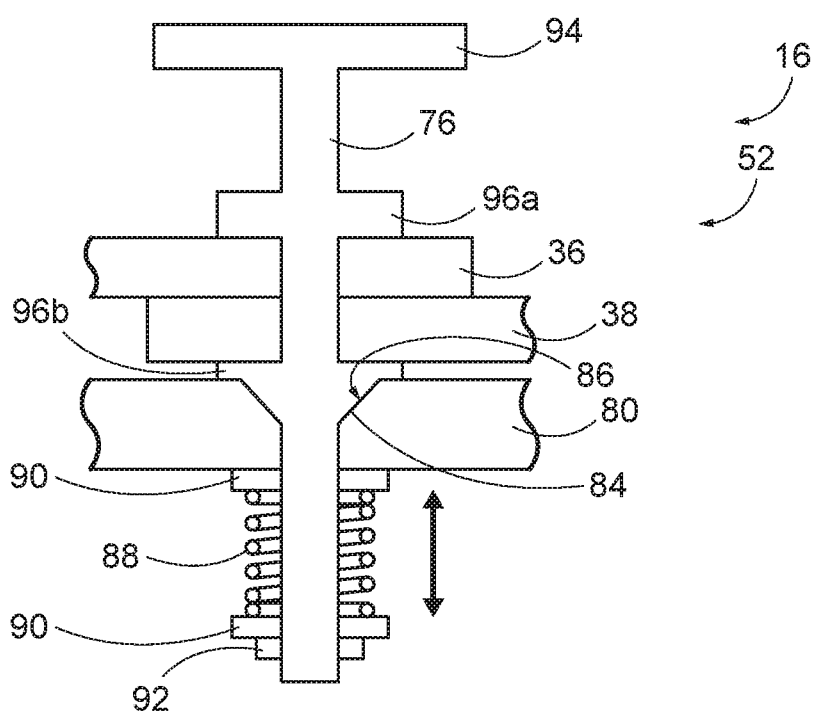
FIG. 7 is a schematic, cross-sectional representation of the stiffness adjustment mechanism of FIG. 6, in a second configuration.

Sliding member 52 (e.g., slider pin 76) may be configured to be selectively locked, or maintained, in place in one or more respective locations within longitudinally extending slot 78, corresponding to different configurations (and stiffnesses) of seatback support structure 50. FIGS. 6-7 illustrate one example of a mechanism for selectively locking slider pin 76 in place within longitudinally extending slot 78, thereby selectively maintaining seatback support structure 50 in the desired configuration corresponding to the desired overall stiffness. However, one of skill in the art will recognize many different suitable mechanisms for selectively locking sliding member 52 in place.

Figure 8:
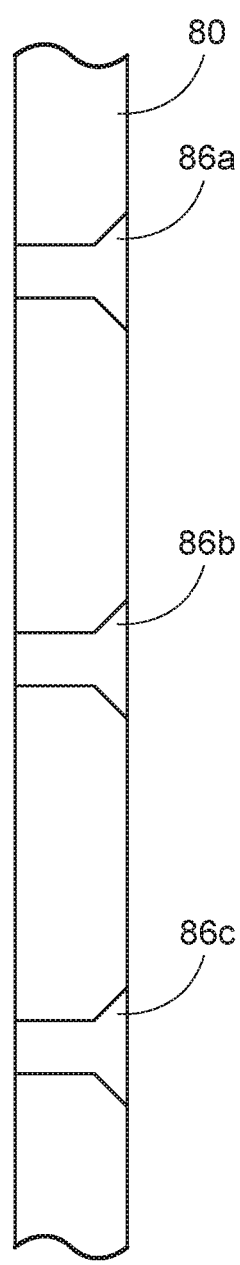
FIG. 8 is a schematic, side cut-away view of a portion of an example of presently disclosed stiffness adjustment mechanisms.
Figure 9:
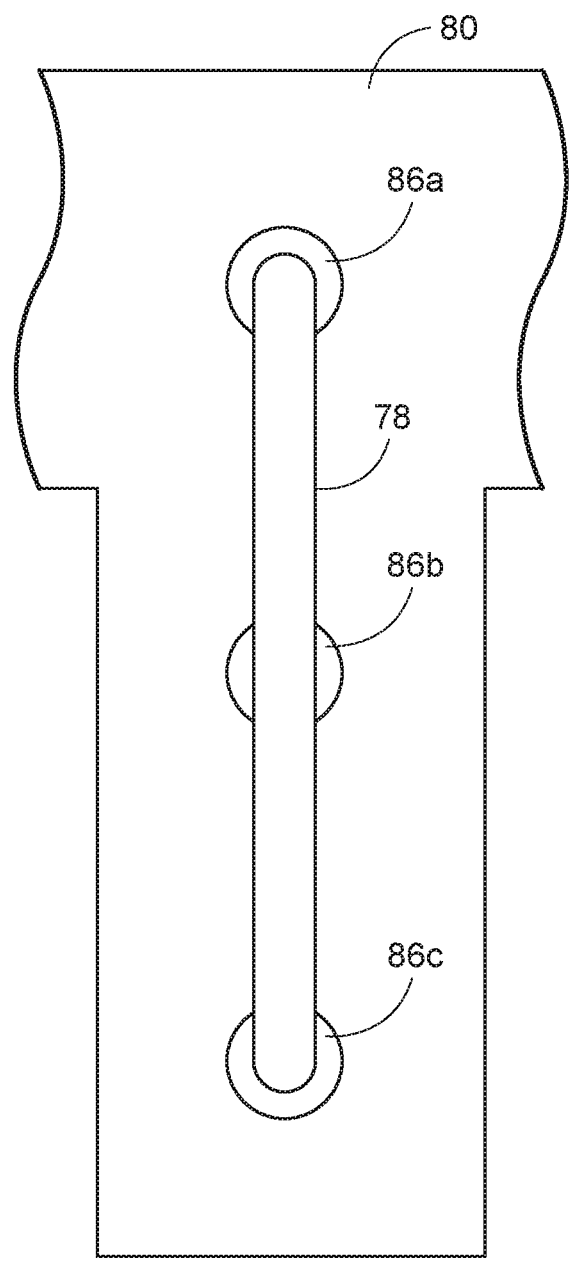
FIG. 9 is a schematic, front view of a portion of the stiffness adjustment mechanism of FIG. 9.

As shown in FIGS. 6-7, slider pin 76 may extend through first elongated member 36, second elongated member 38, and slider track 80. FIG. 6 illustrates slider pin 76 in a first position, or configuration, in which slider pin 76 is free to slide, or translate, within longitudinally extending slot 78, and FIG. 7 illustrates slider pin 76 in a second position, in which slider pin 76 is effectively locked, or fixed, with respect to longitudinally extending slot 78. In the example shown in FIGS. 6-7, slider pin 76 includes a beveled or chamfered portion 84 that is engaged with a countersunk hole 86 formed in slider track 80 when sliding member 52 is in the fixed position shown in FIG. 7. For example, a plurality of countersunk holes 86 may be formed in longitudinally extending slot 78, with each countersunk hole 86 corresponding to a different respective position for slider pin 76 (or other sliding member 52). A compression spring 88 positioned on the opposite side of slider track 80 from countersunk hole 86 may be biased to retain beveled portion 84 of slider pin 76 in the respective countersunk hole 86 in which it is positioned. One or more washers 90 and/or fasteners 92 may be utilized to secure compression spring 88 to slider pin 76, as shown. To move slider pin 76 to a different position (e.g., to a different countersunk hole 86), tension is applied to slider pin 76 to compress compression spring 88, thereby lifting beveled portion 84 of slider pin 76 out of the respective countersunk hole 86, as shown in FIG. 6. Slider pin 76 can then be selectively translated along longitudinally extending slot 78, until beveled portion 84 is positioned within the desired countersunk hole 86. In some examples, slider pin 76 includes a handle 94 configured to compress compression spring 88 and enable movement of slider pin 76 by moving beveled portion 84 out of countersunk hole 86. When handle 94 is released, compression spring is biased to return to the extended position shown in FIG. 7, thereby retaining slider pin 76 in the respective countersunk hole 86 into which it was positioned. Slider pin 76 may also include one or more flanges 96, such as flange 96a and 96b, positioned on opposite sides of first elongated member 36 and second elongated member 38, as shown in FIGS. 6-7. FIGS. 8-9 illustrate a portion of slider track 80, showing three countersunk holes 86 (countersunk hole 86a, 86b, and 86c) positioned within longitudinally extending slot 78 of slider track 80. Longitudinally extending slot 78 may extend through the entire thickness of slider track 80, with slider pin 76 extending all the way through longitudinally extending slot 78, such that slider pin 76 may be selectively translated along longitudinally extending slot 78 in order to position stiffness adjustment mechanism 16 and adjust the stiffness of seatback support structure 50.

Figure 10:
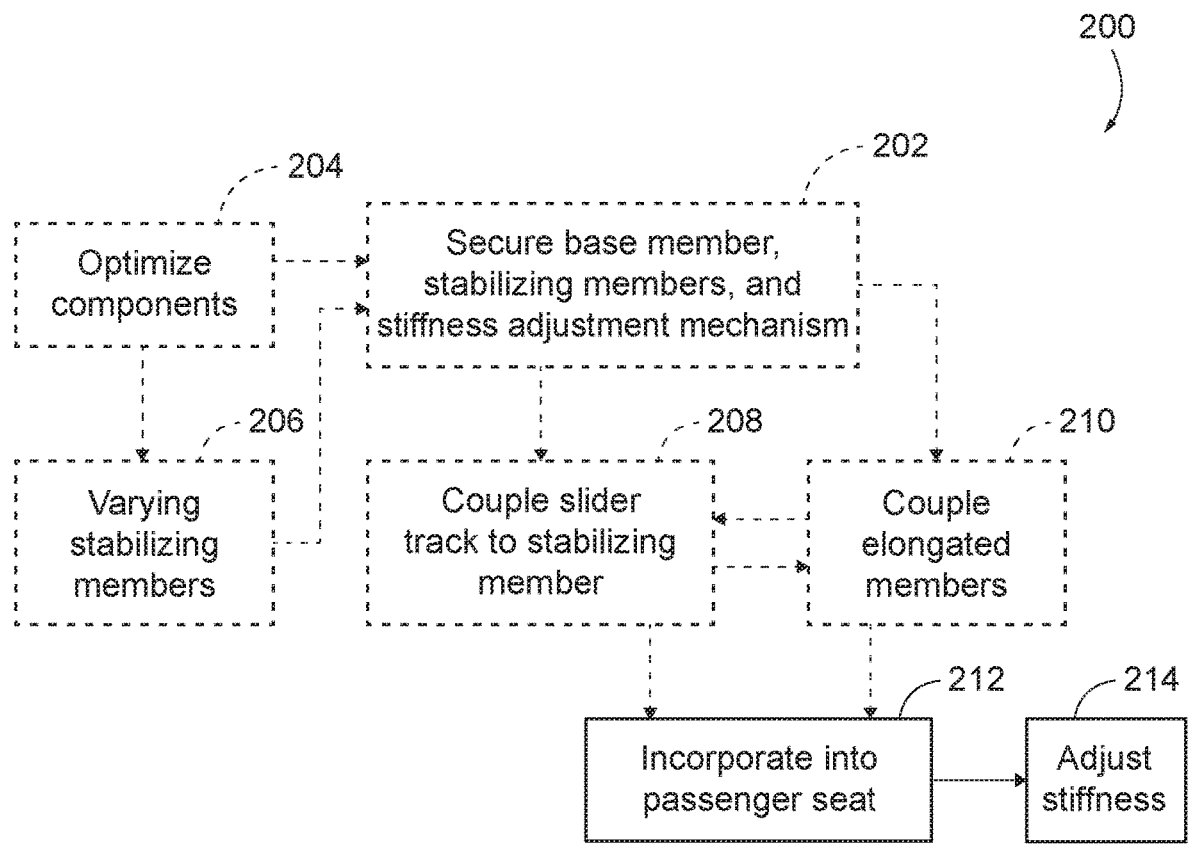
FIG. 10 a flowchart schematically representing methods of forming seatback support structures according to the present disclosure.

FIG. 10 schematically provides a flowchart that represents illustrative, non-exclusive examples of methods 200 according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Methods 200 of forming a seatback support structure, such as seatback support structure 10, generally include securing a base member (e.g., base member 14), a plurality of stabilizing members (e.g., stabilizing members 12), and a stiffness adjustment mechanism (e.g., stiffness adjustment mechanism 16) with respect to one another at 202, to form a seatback support structure that is configured to provide selective adjustment of the stiffness of the seatback support structure, by a user. Some methods 200 include designing and/or optimizing one or more components of the seatback support structure, at 204. For example, optimizing the components at 204 may include selecting an optimum number of stabilizing members to form the seatback support structure, such as performing an analysis to determine the optimum number of stabilizing members to obtain the overall desired rigidity (or range of rigidity) and/or the desired localized ergonomic support. Additionally or alternatively, optimizing the components at 204 may include selecting the optimum or desired length for each respective stabilizing member, such that the seatback support structure provides the desired range of stiffness for the desired range of user heights and/or weights. Similarly, optimizing the components at 204 may additionally or alternatively include selecting an optimum length for the base member, selecting respective optimum lengths for elongated members of the stiffness adjustment mechanism (e.g., first elongated member 36 and second elongated member 38), and/or designing optimum curvature along the length of each respective stabilizing member.

Some methods 200 include varying the length, material composition, cross-sectional shape, and/or thickness of two or more different stabilizing members at 206. For example, varying the stabilizing members at 206 may include providing at least one first respective stabilizing member having a first stiffness, at least one second respective stabilizing member having a second stiffness, and/or at least one third respective stabilizing member having a third stiffness. Additionally or alternatively, varying the stabilizing members at 206 may include providing at least one respective stabilizing member that is formed of a first material or composition, and providing at least one other respective stabilizing member that is formed of a different material or composition. In some examples, varying the stabilizing members at 206 includes varying at least one of length, material composition, cross-sectional shape, and/or thickness of at least one respective stabilizing member along the length of the respective stabilizing member. For example, a given stabilizing member may be formed to be thicker at one end than another, and/or formed of a different material or composition in some areas or portions of the stabilizing member than in others.

Methods 200 may include coupling a slider track (e.g., slider track 80) of the stiffness adjustment mechanism to one or more stabilizing members at 208. For example, a T-shaped slider track may be coupled to three respective stabilizing members in some examples. In other examples, a T-shaped (or otherwise shaped) slider track may be coupled to one or more, two or more, three or more, four or more, five or more, and/or six or more stabilizing members, at 208. Elongated members may be coupled to a sliding member of the slider track (e.g., sliding member 52) at 210. For example, the first elongated member of the linkage of the stiffness adjustment mechanism may be coupled to the sliding member of the slider track such that a first end of the first elongated member is configured to pivot about the sliding member as the sliding member is longitudinally translated within the longitudinally extending slot of the slider track. The first elongated member may be further rotatably coupled to a stabilizing member at 210, such that the first elongated member is configured to rotate with respect to the stabilizing member when the first end of the elongated member is translated with respect to the slider track. Similarly, coupling the elongated members to the sliding member at 210 may include coupling the second elongated member of the linkage of the stiffness adjustment mechanism to the sliding member of the slider track such that a first end of the second elongated member is configured to pivot about the sliding member as the sliding member is longitudinally translated within the longitudinally extending slot of the slider track. The second elongated member may be further rotatably coupled to a stabilizing member (which may be a different respective stabilizing member than that to which the first elongated member is coupled) such that the second elongated member is configured to pivot with respect to the stabilizing member to which it is coupled, when the first end of the second elongated member is translated with respect to the slider track.

Such disclosed seatback support structures and variations thereof may be incorporated into any type of seat, at 212. For example, disclosed seatback support structures may be retrofit into existing passenger seats for aircraft, buses, boats, trains, cars, trucks, or other air, spacecraft, marine, or land vehicles. In some methods 200, incorporating the seatback support structure into a seat at 212 may include providing or manufacturing a seat that includes such a seatback support structure according to the present disclosure. Methods 200 also include adjusting the effective stiffness of the seatback support structure at 214, such as by moving the linkage of the stiffness adjustment mechanism with respect to the stabilizing members and base member. For example, the stiffness adjustment mechanism may allow a user to adjust the stiffness of the seatback support structure between stiff, medium, and compliant settings, thus allowing a user to experience increased comfort when sitting in a seat that includes disclosed seatback support structures. Such disclosed seatback support structures may thus allow a user to selectively adjust the seat to his or her preferences independent of other passengers.

Illustrative, non-exclusive examples of inventive subject matter according to the present disclosure are described in the following enumerated paragraphs:

A1. A seatback support structure, comprising:
a base member;
a plurality of stabilizing members extending from the base member, wherein the stabilizing members are cantilevered such that a first end of each respective stabilizing member is coupled to the base member, and wherein each respective stabilizing member comprises a second end opposite the first end; and
a stiffness adjustment mechanism comprising at least one linkage configured to be selectively movable with respect to each of the stabilizing members, wherein the stiffness adjustment mechanism is configured to change the effective stiffness of the seatback support structure when the at least one linkage is moved with respect to the stabilizing members.

A2. The seatback support structure of paragraph A1, wherein the base member is arranged substantially perpendicularly to the stabilizing members.

A3. The seatback support structure of any of paragraphs A1-A2, wherein the stabilizing members are arranged substantially along a longitudinal axis of the seatback support structure.

A3.1. The seatback support structure of any of paragraphs A1-A3, wherein the respective second end of each respective stabilizing member is a free end that is configured to deflect with respect to the base member, when loaded a sufficient amount.

A4. The seatback support structure of any of paragraphs A1-A3.1, wherein at least a first stabilizing member of the plurality of stabilizing members has a different stiffness than at least a second stabilizing member of the plurality of stabilizing members.

A5. The seatback support structure of any of paragraphs A1-A4, wherein at least a/the first stabilizing member of the plurality of stabilizing members is formed of a different material than at least a/the second stabilizing member of the plurality of stabilizing members.

A6. The seatback support structure of any of paragraphs A1-A5, wherein at least a/the first stabilizing member of the plurality of stabilizing members has a different thickness than at least a/the second stabilizing member of the plurality of stabilizing members.

A7. The seatback support structure of any of paragraphs A1-A6, wherein at least a/the first stabilizing member of the plurality of stabilizing members has a different cross-sectional shape than at least a/the second stabilizing member of the plurality of stabilizing members.

A8. The seatback support structure of any of paragraphs A1-A7, wherein the seatback support structure comprises a front portion configured to face and support a user's back while seated, and wherein the seatback support structure comprises a rear portion opposite the front portion.

A9. The seatback support structure of paragraph A8, wherein the at least one linkage is operatively coupled to the rear portion of the seatback support structure.

A10. The seatback support structure of any of paragraphs A1-A9, wherein the at least one linkage is coupled to one of the plurality of stabilizing members.

A11. The seatback support structure of any of paragraphs A1-A10, wherein the at least one linkage is coupled to a central stabilizing member of the plurality of stabilizing members.

A12. The seatback support structure of any of paragraphs A1-A11, wherein the at least one linkage is coupled to a first plurality of the plurality of stabilizing members.

A13. The seatback support structure of any of paragraphs A1-A12, wherein the at least one linkage is coupled to a stiffest stabilizing member of the plurality of stabilizing members.

A14. The seatback support structure of any of paragraphs A1-A13, wherein the at least one linkage is coupled to all of the stabilizing members of the plurality of stabilizing members.

A15. The seatback support structure of any of paragraphs A1-A14, wherein the at least one linkage is coupled to a/the central stabilizing member and a respective stabilizing member on either side of the central stabilizing member.

A16. The seatback support structure of any of paragraphs A1-A15, wherein the at least one linkage is coupled to a/the central stabilizing member and a respective adjacent stabilizing member on either side of the central stabilizing member.

A17. The seatback support structure of any of paragraphs A1-A16, wherein movement of the linkage with respect to the base member changes an effective cantilever length of at least one of the stabilizing members, wherein the effective cantilever length is defined as the distance between a point on the respective stabilizing member that is engaged with the linkage and the second end of the respective stabilizing member.

A18. The seatback support structure of any of paragraphs A1-A17, wherein movement of a sliding member of the linkage away from the base member decreases the overall stiffness of the seatback support structure.

A19. The seatback support structure of any of paragraphs A1-A18, wherein movement of a/the sliding member of the linkage away from the base member increases an/the effective cantilever length of at least one of the stabilizing members.

A20. The seatback support structure of any of paragraphs A1-A19, wherein movement of a/the sliding member of the linkage towards the base member increases the overall stiffness of the seatback support structure.

A21. The seatback support structure of any of paragraphs A1-A20, wherein movement of a/the sliding member of the linkage towards the base member decreases an/the effective cantilever length of at least one of the stabilizing members.

A22. The seatback support structure of any of paragraphs A1-A21, wherein the at least one linkage comprises a first elongated member, wherein the first elongated member is coupled to a/the sliding member of the linkage, and wherein the first elongated member is further coupled to at least a first respective stabilizing member of the plurality of stabilizing members.

A22.1 The seatback support structure of paragraph A22, wherein the first elongated member is linear, curved, and/or angled, and wherein movement of the first elongated member with respect to the base member causes variations in stiffness of the seatback support structure.

A22.2. The seatback support structure of any of paragraphs A1-A22.1, wherein the at least one linkage comprises a second elongated member, wherein the second elongated member is coupled to a/the sliding member of the linkage, and wherein the second elongated member is further coupled to at least a second respective stabilizing member of the plurality of stabilizing members.

A23. The seatback support structure of any of paragraphs A1-A22.2, wherein movement of the linkage with respect to the base member changes a deflection of at least one of the stabilizing members in response to a given applied load.

A24. The seatback support structure of any of paragraphs A1-A23, wherein movement of the linkage in a first direction with respect to the base member reduces a deflection of at least one of the stabilizing members under a given load by shortening an/the effective cantilever length of at least one stabilizing member, and wherein movement of the linkage in a second direction opposite the first direction with respect to the base member increases the deflection of at least one of the stabilizing members under the given load by increasing the effective cantilever length of the at least one stabilizing member.

A25. The seatback support structure of any of paragraphs A1-A24, wherein the stiffness adjustment mechanism is configured to respond to a given load differently at different locations of the seatback support structure.

A26. The seatback support structure of any of paragraphs A1-A25, wherein the stiffness adjustment mechanism is configured to vary the stiffness of the seatback support structure by changing the weight distribution across the stabilizing members.

A27. The seatback support structure of any of paragraphs A1-A26, wherein the stiffness adjustment mechanism is configured to be selectively adjusted between a first configuration and a second configuration, wherein a first effective stiffness of the seatback support structure in the first configuration is different than a second effective stiffness of the seatback support structure in the second configuration.

A28. The seatback support structure of paragraph A27, wherein, in the first configuration, a user's weight is spread substantially equally across each respective stabilizing member of the plurality of stabilizing members.

A29. The seatback support structure of any of paragraphs A27-A28, wherein, in the first configuration a/the sliding member of the linkage is positioned such that a/the first elongated member and/or a/the second elongated member is/are substantially parallel to the base member.

A30. The seatback support structure of any of paragraphs A27-A29, wherein, in the first configuration a/the sliding member of the linkage is positioned such that a/the first elongated member and/or a/the second elongated member is/are substantially perpendicular to the stabilizing members.

A31. The seatback support structure of any of paragraphs A27-A30, wherein, in the first configuration a/the sliding member of the linkage is positioned such that a/the first elongated member and a/the second elongated member are substantially co-linear with one another.

A32. The seatback support structure of any of paragraphs A27-A31, wherein, in the first configuration, a/the sliding member of the linkage is positioned a first distance from the base member, and wherein, in the second configuration, the sliding member is positioned a second distance from the base member, wherein the second distance is less than the first distance.

A33. The seatback support structure of any of paragraphs A27-A32, wherein, in the second configuration, a/the first elongated member of the linkage and/or a/the second elongated member of the linkage is/are non-parallel to the base member.

A34. The seatback support structure of any of paragraphs A27-A33, wherein, in the second configuration, a/the first elongated member of the linkage and/or a/the second elongated member of the linkage is/are non-perpendicular to the stabilizing members.

A35. The seatback support structure of any of paragraphs A27-A34, wherein, in the second configuration, a/the first elongated member of the linkage and/or a/the second elongated member of the linkage is/are at a non-parallel angle with respect to one another.

A36. The seatback support structure of any of paragraphs A27-A35, wherein, in the second configuration, the user's weight is selectively distributed differently among the respective stabilizing members.

A37. The seatback support structure of any of paragraphs A27-A36, wherein, in the second configuration, a greater proportion of the user's weight is distributed to a respective stiffest stabilizing member of the plurality of stabilizing members.

A38. The seatback support structure of any of paragraphs A27-A37, wherein, in the second configuration, a greater proportion of the user's weight is distributed to respective portions of respective stabilizing members of the plurality of stabilizing members, the respective portions of the respective stabilizing members being stiffer than other respective portions of the respective stabilizing members.

A39. The seatback support structure of any of paragraphs A27-A38, wherein the stiffness adjustment mechanism is configured to be selectively adjusted between the first configuration, the second configuration, and a third configuration, wherein a third effective stiffness of the seatback support structure in the third configuration is different than the first effective stiffness and the second effective stiffness of the seatback support structure in the first and second configurations, respectively.

A40. The seatback support structure of any of paragraphs A27-A39, wherein, in the first configuration, a/the sliding member of the linkage is positioned a/the first distance from the base member, and wherein, in the second configuration, the sliding member is positioned a/the second distance from the base member, wherein in the third configuration, the sliding member is positioned a third distance from the base member, wherein the second distance is less than the first distance, and wherein the third distance is less than the second distance.

A41. The seatback support structure of any of paragraphs A1-A40, wherein the stiffness adjustment mechanism is configured to distribute the user's weight to different respective stabilizing members of the plurality of stabilizing members, depending on the adjustment of the effective stiffness of the seatback support structure.

A42. The seatback support structure of any of paragraphs A1-A41, wherein the linkage of the stiffness adjustment mechanism comprises a/the sliding member configured to longitudinally slide with respect to at least one respective stabilizing member of the plurality of stabilizing members.

A43. The seatback support structure of paragraph A42, wherein the sliding member comprises a slider pin configured to slide within a longitudinally extending slot of a slider track of the stiffness adjustment mechanism.

A44. The seatback support structure of paragraph A43, wherein the slider track is adjacent one respective stabilizing member of the plurality of stabilizing members.

A45. The seatback support structure of any of paragraphs A43-A44, wherein the slider track is coupled to at least one respective stabilizing member of the plurality of stabilizing members.

A46. The seatback support structure of any of paragraphs A43-A45, wherein the slider track is fixedly attached to at least two respective stabilizing members of the plurality of stabilizing members.

A47. The seatback support structure of any of paragraphs A43-A46, wherein the slider track is fixedly attached to at least three respective stabilizing members of the plurality of stabilizing members.

A48. The seatback support structure of any of paragraphs A43-A47, wherein the slider track is substantially T-shaped.

A49. The seatback support structure of any of paragraphs A43-A48, wherein the longitudinally extending slot of the slider track is substantially parallel to the stabilizing members.

A50. The seatback support structure of any of paragraphs A43-A49, wherein the sliding member is configured to be selectively locked in place in one or more respective locations within the longitudinally extending slot.

A51. The seatback support structure of any of paragraphs A1-A50, wherein the linkage comprises a first rotator pin coupling a/the first elongated member of the linkage to a first respective stabilizing member, wherein the first elongated member is configured to rotate with respect to the first respective stabilizing member via the first rotator pin.

A51.1. The seatback support structure of paragraph A51, wherein the linkage further comprises a second rotator pin coupling a/the second elongated member of the linkage to a second respective stabilizing member, wherein the second elongated member is configured to rotate with respect to the second respective stabilizing member via the second rotator pin.

A52. The seatback support structure of any of paragraphs A1-A51.1, wherein a first end of a/the first elongated member is rotatably coupled to a/the sliding member such that movement of the sliding member with respect to a/the slider track changes an angle formed between the first elongated member and the base member.

A52.1. The seatback support structure of paragraph A52, wherein a first end of a/the second elongated member is rotatably coupled to the sliding member such that movement of the sliding member with respect to the slider track changes an angle formed between the first elongated member and the second elongated member.

A53. The seatback support structure of any of paragraphs A1-A52.1, wherein a/the first elongated member of the linkage is rotatably coupled to a/the second elongated member of the linkage, adjacent a/the slider track, via a/the sliding member.

A54. The seatback support structure of any of paragraphs A1-A53, wherein the stiffness adjustment mechanism is configured to be selectively locked, once adjusted, until the effective stiffness is selectively adjusted again.

A55. The seatback support structure of any of paragraphs A1-A54, wherein a/the central stabilizing member of the plurality of stabilizing members is positioned between a first respective stabilizing member and a second respective stabilizing member, and wherein the linkage is coupled to the central stabilizing member.

A56. The seatback support structure of any of paragraphs A1-A55, wherein a/the central stabilizing member of the plurality of stabilizing members is stiffer than any other respective stabilizing member.

A57. The seatback support structure of any of paragraphs A1-A56, wherein the stiffness of respective stabilizing members decreases to either side of a/the central stabilizing member of the plurality of stabilizing members.

A58. The seatback support structure of any of paragraphs A1-A57, wherein the plurality of stabilizing members comprises a/the central stabilizing member, a left stabilizing member, and a right stabilizing member, wherein the left and right stabilizing members are less stiff than the central stabilizing member.

A59. The seatback support structure of paragraph A58, wherein the plurality of stabilizing members comprises at least a first stabilizing member positioned between the central stabilizing member and the left stabilizing member, and at least a second stabilizing member positioned between the central stabilizing member and the right stabilizing member, wherein the first stabilizing member is less stiff than the central stabilizing member and more stiff than the left stabilizing member, and wherein the second stabilizing member is less stiff than the central stabilizing member and more stiff than the right stabilizing member A60. The seatback support structure of any of paragraphs A1-A59, wherein the stiffness adjustment mechanism further comprises a user interface configured to enable a user to selectively adjust the effective stiffness of the seatback support structure, via the stiffness adjustment mechanism.

A61. The seatback support structure of paragraph A60, wherein the user interface is configured to selectively move the at least one linkage with respect to the plurality of stabilizing members.

A62. The seatback support structure of any of paragraphs A1-A61, wherein the stiffness adjustment mechanism and/or a/the user interface is configured for continuous adjustment of the effective stiffness of the seatback support structure.

A63. The seatback support structure of any of paragraphs A1-A62, wherein the stiffness adjustment mechanism and/or a/the user interface is configured for discrete adjustment of the effective stiffness of the seatback support structure.

A64. The seatback support structure of any of paragraphs A1-A63, wherein a/the user interface of the stiffness adjustment mechanism is configured to adjust the effective stiffness of the seatback support structure between at least two different stiffness settings, at least three different stiffness settings, at least four different stiffness settings, at least five different stiffness settings, and/or at least six different stiffness settings.

A65. The seatback support structure of any of paragraphs A1-A64, wherein a/the user interface of the stiffness adjustment mechanism mechanically or physically moves the at least one linkage via manual adjustment by the user.

A66. The seatback support structure of any of paragraphs A1-A65, wherein a/the user interface of the stiffness adjustment mechanism is configured for electronic adjustment of the effective stiffness of the seatback support structure.

A67. The seatback support structure of any of paragraphs A1-A66, wherein the stiffness adjustment mechanism hydraulically moves the linkage of the stiffness adjustment mechanism to change the effective stiffness of the seatback support structure.

A68. The seatback support structure of any of paragraphs A1-A67, wherein the stiffness adjustment mechanism is configured to provide selective adjustment of the effective stiffness of just a portion of the seatback support structure.

A69. The seatback support structure of any of paragraphs A1-A68, wherein the stiffness adjustment mechanism is configured to provide selective adjustment of just a portion of one or more respective stabilizing members.

A70. The seatback support structure of any of paragraphs A1-A69, wherein the base member, a/the first elongated member, and/or a/the second elongated member is/are sufficiently rigid to transfer and distribute the rigidity of a/the central stabilizing member of the plurality of stabilizing members to respective portions of the other stabilizing members between a/the first elongated member and the base member and/or to respective portions of the other stabilizing members between a/the second elongated member and the base member.

A71. The seatback support structure of any of paragraphs A1-A70, further comprising a deflection limiting mechanism configured to limit the overall deflection of the seatback support structure.

A72. The seatback support structure of any of paragraphs A1-A71, wherein the stabilizing members are spaced apart and do not contact each other during normal use of the seatback support structure.

A73. The seatback support structure of any of paragraphs A1-A72, wherein the stabilizing members may contact each other during use of the seatback support structure.

A74. The seatback support structure of any of paragraphs A1-A73, wherein at least one stabilizing member has a variable thickness, a variable cross-sectional area or shape, a variable stiffness, and/or a variable material composition along its length.

A75. The seatback support structure of any of paragraphs A1-A74, wherein at least one stabilizing member of the plurality of stabilizing members has a greater stiffness adjacent its second end than adjacent its first end.

A75.1. The seatback support structure of any of paragraphs A1-A75, wherein at least one stabilizing member of the plurality of stabilizing members has a greater stiffness adjacent its first end than adjacent its second end.

A75.2. The seatback support structure of any of paragraphs A1-A75.1, wherein at least one stabilizing member of the plurality of stabilizing members has a greater stiffness in one portion of the stabilizing member than in another portion of the stabilizing member.

A76. The seatback support structure of any of paragraphs A1-A75.2, wherein at least one stabilizing member of the plurality of stabilizing members comprises nylon, PEEK, glass fibers, carbon fibers, and/or combinations or composites thereof.

A77. The seatback support structure of any of paragraphs A1-A76, wherein at least a portion of at least one of the plurality of stabilizing members is at least partially hollow.

A77.1. The seatback support structure of any of paragraphs A1-A77, wherein the stiffness adjustment mechanism is configured to be automatically adjusted, optionally via one or more sensors and/or a controller.

A78. A seat for an aircraft, or other vehicle, comprising the seatback support structure of any of paragraphs A1-A77.1.

A79. The seat of paragraph A78, further comprising foams and/or local reinforcements configured to enhance the overall ergonomics.

B1. A method, comprising:
securing a base member, a plurality of stabilizing members, and a stiffness adjustment mechanism with respect to one another, to form the seatback support structure of any of paragraphs A1-A77.1.

B2. The method of paragraph B1, further comprising:
selecting an optimum number of stabilizing members for the seatback support structure, to obtain the desired overall rigidity and/or localized ergonomic support.

B3. The method of any of paragraphs B1-B2, further comprising:
selecting an optimum length for each respective stabilizing member of the plurality of stabilizing members, such that the seatback support structure provides the desired range of stiffness.

B4. The method of any of paragraphs B1-B3, further comprising:
selecting an optimum length for the base member.

B5. The method of any of paragraphs B1-B4, further comprising:
selecting a first optimum length for a/the first elongated member of the linkage of the stiffness adjustment mechanism; and
selecting a second optimum length for a/the second elongated member of the linkage of the stiffness adjustment mechanism, wherein the first and second optimum lengths are selected to configure the seatback support structure to provide the desired range of stiffness.

B6. The method of any of paragraphs B1-B5, further comprising:
designing an optimum curvature along the length of each respective stabilizing member of the plurality of stabilizing members.

B7. The method of any of paragraphs B1-B6, further comprising:
varying at least one of length, material composition, cross-sectional shape, and/or thickness of at least one respective stabilizing member of the plurality of stabilizing members, along the length of the respective stabilizing member.

B8. The method of any of paragraphs B1-B7, further comprising:
coupling a/the slider track of the stiffness adjustment mechanism to at least one respective stabilizing member of the plurality of stabilizing members;
coupling a/the first elongated member of the linkage of the stiffness adjustment mechanism to a/the sliding member of the slider track such that a first end of the first elongated member is configured to pivot about the sliding member as the sliding member is longitudinally translated within a/the longitudinally extending slot of the slider track; and
rotatably coupling the first elongated member to a first respective stabilizing member of the plurality of stabilizing members such that the first elongated member is configured to pivot with respect to the first respective stabilizing member when the first end of the first elongated member is longitudinally translated with respect to the slider track.

B9. The method of paragraph B8, further comprising:
coupling a/the second elongated member of the linkage of the stiffness adjustment mechanism to the sliding member of the slider track such that a first end of the second elongated member is configured to pivot about the sliding member as the sliding member is longitudinally translated within the longitudinally extending slot of the slider track; and
rotatably coupling the second elongated member to a second respective stabilizing member of the plurality of stabilizing members such that the second elongated member is configured to pivot with respect to the second respective stabilizing member when the first end of the second elongated member is longitudinally translated with respect to the slider track.

C1. A method, comprising incorporating the seatback support structure of any of paragraphs A1-A77.1 into a seat of an aircraft or other vehicle.

C2. The method of paragraph C1, further comprising selectively adjusting the stiffness of the seatback support structure by moving the linkage of the stiffness adjustment mechanism with respect to the plurality of stabilizing members.

D1. A passenger vehicle, comprising the seatback support structure of any of paragraphs A1-A77.1.

D2. The passenger vehicle of paragraph D1, wherein the passenger vehicle is a passenger aircraft.

E1. The use of the seatback structure of any of paragraphs A1-A77.1 in a seat of an aircraft or other vehicle.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The invention claimed is:

1. A seatback support structure, comprising:
   a base member at a lower end of a seatback of the seatback support structure;
   a plurality of stabilizing members extending from the base member, wherein the stabilizing members are cantilevered such that a first end of each respective stabilizing member is coupled to the base member, and wherein each respective stabilizing member comprises a second end opposite the first end; and
   a stiffness adjustment mechanism comprising at least one linkage rotatably coupled to at least one of the stabilizing members and configured to be selectively movable with respect to each of the stabilizing members, wherein the stiffness adjustment mechanism is configured to change an effective stiffness of the seatback support structure by changing an effective cantilever length of at least another of the stabilizing members when the at least one linkage is moved with respect to the stabilizing members.

2. The seatback support structure according to claim 1, wherein the respective second end of each respective stabilizing member is a free end that is configured to deflect with respect to the base member, when loaded a sufficient amount.

3. The seatback support structure according to claim 1, wherein at least a first stabilizing member of the plurality of stabilizing members has a different stiffness than at least a second stabilizing member of the plurality of stabilizing members.

4. The seatback support structure according to claim 1, wherein the at least one linkage is coupled to a stiffest respective stabilizing member of the plurality of stabilizing members.

5. The seatback support structure according to claim 1, wherein movement of the linkage with respect to the base member changes the effective cantilever length of at least one of the stabilizing members including the other stabilizing member, wherein the effective cantilever length is defined as a distance between a point on the respective stabilizing member that is engaged with the linkage and the second end of the respective stabilizing member.

6. The seatback support structure according to claim 5, wherein movement of a sliding member of the linkage away from the base member decreases the effective stiffness of the seatback support structure by increasing the effective cantilever length of at least one of the stabilizing members.

7. The seatback support structure according to claim 1, wherein the stiffness adjustment mechanism is configured to vary the effective stiffness of the seatback support structure by changing a weight distribution across the stabilizing members.

8. The seatback support structure according to claim 1, wherein the at least one linkage comprises a first elongated member and a second elongated member, wherein the first elongated member and the second elongated member are coupled to a sliding member of the linkage, wherein the first elongated member is further coupled to at least a first respective stabilizing member of the plurality of stabilizing members, and wherein the second elongated member is further coupled to at least a second respective stabilizing member of the plurality of stabilizing members.

9. The seatback support structure according to claim 8, wherein the stiffness adjustment mechanism is configured to be selectively adjusted between a first configuration and a second configuration, wherein a first effective stiffness of the seatback support structure in the first configuration is different than a second effective stiffness of the seatback support structure in the second configuration.

10. The seatback support structure according to claim 9, wherein, in the first configuration, the sliding member of the linkage is positioned a first distance from the base member, and wherein, in the second configuration, the sliding member is positioned a second distance from the base member, wherein the second distance is less than the first distance.

11. The seatback support structure according to claim 10, wherein, in the first configuration, the sliding member of the linkage is positioned such that the first elongated member and the second elongated member are substantially parallel to one another, and wherein, in the second configuration, the first elongated member of the linkage and the second elongated member of the linkage are non-parallel to the base member and arranged at a non-parallel angle with respect to one another.

12. The seatback support structure according to claim 8, wherein the sliding member of the linkage is configured to longitudinally slide with respect to at least one respective stabilizing member of the plurality of stabilizing members, wherein the sliding member comprises a slider pin configured to slide within a longitudinally extending slot of a slider track of the stiffness adjustment mechanism, and wherein the slider track is coupled to at least one respective stabilizing member of the plurality of stabilizing members.

13. The seatback support structure according to claim 12, wherein the sliding member is configured to be selectively locked in place in one or more respective locations within the longitudinally extending slot, thereby selectively locking the stiffness adjustment mechanism until the effective stiffness is selectively adjusted again.

14. The seatback support structure according to claim 8, wherein the linkage comprises a first rotator pin coupling the first elongated member of the linkage to the first respective stabilizing member, wherein the linkage further comprises a second rotator pin coupling the second elongated member of the linkage to the second respective stabilizing member, wherein the first elongated member is configured to rotate with respect to the first respective stabilizing member via the first rotator pin, and wherein the second elongated member is configured to rotate with respect to the second respective stabilizing member via the second rotator pin.

15. The seatback support structure according to claim 14, wherein a first end of the first elongated member and a first end of the second elongated member are rotatably coupled to the sliding member such that movement of the sliding member with respect to a slider track changes an angle formed between the first elongated member and the second elongated member.

16. The seatback support structure according to claim 8, wherein a central stabilizing member of the plurality of stabilizing members is positioned between the first respective stabilizing member and the second respective stabilizing member, wherein the linkage is coupled to the central stabilizing member, and wherein the central stabilizing member is stiffer than any other respective stabilizing member.

17. The seatback support structure according to claim 1, wherein the stiffness adjustment mechanism further comprises a user interface configured to enable a user to selectively adjust the effective stiffness of the seatback support structure, via the stiffness adjustment mechanism, wherein the user interface is configured to selectively move the at least one linkage with respect to the plurality of stabilizing members.

18. A seat for a passenger vehicle, comprising:
the seatback support structure according to claim 1; and
a cushioning material at least partially surrounding the seatback support structure, and configured to increase comfort of the seat.

19. A method, comprising:
securing the plurality of stabilizing members to the base member, wherein the stabilizing members are cantilevered such that a first end of each respective stabilizing member is coupled to the base member, and wherein each respective stabilizing member comprises a second end opposite the first end; and
securing the stiffness adjustment mechanism to the plurality of stabilizing members, thereby forming the seatback support structure according to claim 1, wherein the stiffness adjustment mechanism comprises the at least one linkage configured to be selectively movable with respect to each of the stabilizing members, and wherein the stiffness adjustment mechanism is configured to change the effective stiffness of the seatback support structure when the at least one linkage is moved with respect to the stabilizing members.

20. The method according to claim 19, further comprising:
coupling a slider track of the stiffness adjustment mechanism to at least one respective stabilizing member of the plurality of stabilizing members;
coupling a first elongated member of the linkage of the stiffness adjustment mechanism to a sliding member of the slider track such that a first end of the first elongated member is configured to pivot about the sliding member as the sliding member is longitudinally translated within a longitudinally extending slot of the slider track;
rotatably coupling the first elongated member to a first respective stabilizing member of the plurality of stabilizing members such that the first elongated member is configured to pivot with respect to the first respective stabilizing member when the first end of the first elongated member is longitudinally translated with respect to the slider track;
coupling a second elongated member of the linkage of the stiffness adjustment mechanism to the sliding member of the slider track such that a first end of the second elongated member is configured to pivot about the sliding member as the sliding member is longitudinally translated within the longitudinally extending slot of the slider track; and
rotatably coupling the second elongated member to a second respective stabilizing member of the plurality of stabilizing members such that the second elongated member is configured to pivot with respect to the second respective stabilizing member when the first end of the second elongated member is longitudinally translated with respect to the slider track.

* * * * *